Patented May 16, 1933

1,909,695

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE DIBENZANTHRONE SERIES

No Drawing. Application filed December 21, 1929, Serial No. 415,782, and in Germany April 8, 1927.

This invention relates to the production of new vat dyestuffs.

We have found that new valuable vat dyestuffs are obtained by condensing polynuclear, isocyclic compounds which contain a plurality of negative substituents but which do not themselves possess vat dyestuff properties with only so much of a dibenzanthorne containing at least one nitrogen atom having a reactive hydrogen atom attached thereto as to produce compounds which still contain negative substituents. As regards the nitrogenous dibenzanthrones, preferably aminodibenzanthrone or derivatives or homologues thereof, in which one hydrogen atom of the amino group may be replaced by a low alkyl radicle such as the methyl, ethyl or propyl group, are employed for the condensation. The negative substituents in the other components may be, for example, halogen atoms or nitro groups. Suitable compounds of the said class are, for example, anthraquinones, phenanthrenequinones, dibenzanthronyls or benzanthrones and also compounds free from keto groups, such as derivatives of naphthalene, anthracene, phenanthrene, fluorene, diphenyl, perylene and the like, containing several negative substituents. The said dyestuffs probably correspond to the general formula

where R stands for a dibenzanthrone radicle, $R_1$ stands for a radicle of a polynuclear, isocyclic compound which does not possess vat dyestuff properties, which radicle contains at least one negative substituent and which may be substituted, for example, by further radicles of the type

and X stands for hydrogen or a lower alkyl radicle.

The condensation is preferably carried out in solvents or diluting media of high boiling point such as nitrobenzene, naphthalene or quinoline, and acid-fixing agents, for example, salts of weak acids such as sodium acetate or the oxides of the alkaline earth metals and catalysts such as copper or its compounds are preferably added. Excellent yields of the new dyestuffs are obtained.

The reaction products dissolve in concentrated sulphuric acid usually to a violet solution. They dye cotton from usually blue vats grey to dark blue to black shades of excellent fastness.

The negative substituents contained in the resulting products may be replaced by other substituents by known methods.

In the above described condensation process nitro compounds of dibenzanthrones may be used as the nitrogeneous component if a reducing agent such as hydrazine hydrate or sulphur and the like be added to the reaction mixture.

The following examples will further illustrate the nature of this invention but the invention is not restricted thereto. The parts are by weight.

Example 1

28 parts of 1.5-dichloranthraquinone are boiled in 1250 parts of nitrobenzene with 25 parts of sodium acetate, 6 parts of copper oxide and 47 parts of aminodibenzanthrone while stirring, until all aminodibenzanthrone has entered into reaction. The dyestuff is isolated by filtration by suction or by distilling off the solvent, if desired with the aid of reduced pressure or of steam or of both. The dyestuff which probably corresponds to the formula

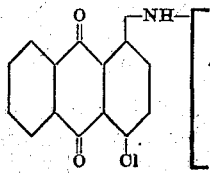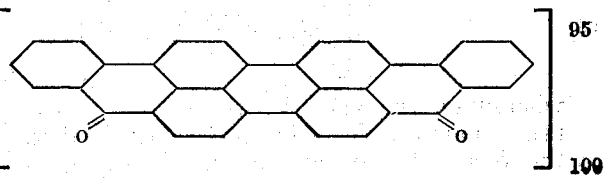

of which a good yield is obtained, is a black powder dissolving in concentrated sulphuric acid with a violet coloration and dyeing cotton grey to black shades of very good fastness from a blue vat.

A reaction product dyeing similar shades is obtained by condensing 1 molecular proportion of 1.5-dinitroanthraquinone with 1 molecular proportion of aminobdibenzanthrone.

Example 2

78 parts of tetrabrom-2.2'-dibenzanthronyl, obtainable by brominating 2.2'-dibenzanthronyl in chlorosulphonic acid, are boiled in 1000 parts of nitrobenzene with 50 parts of sodium acetate, 6 parts of copper oxide and 94 parts of aminodibenzanthrone while stirring, until all aminodibenzanthrone has entered into reaction. The product which is separated in the usual manner, dissolves in concentrated sulphuric acid with a bluish red coloration and dyes the vegetable fibre greenish grey shades of excellent fastness from a blue vat.

Example 3

21 parts of 9.10-dichloranthracene are boiled in 250 parts of nitrobenzene with 47 parts of aminodibenzanthrone, 15 parts of soda ash and 0.2 part of copper acetate while stirring, until unaltered aminodibenzanthrone can no longer be detected. The mass is allowed to cool and worked up in the usual manner. The resulting dyestuff is a greenish black powder dissolving in concentrated sulphuric acid with a reddish violet coloration and dyeing cotton from a blue vat strong grey shades.

Example 4

3 parts of 2.6-dichlorbenzanthrone are boiled for 10 to 15 hours in 250 parts of nitrobenzene with 2.5 parts of sodium acetate, 0.3 part of copper oxide and 4.7 parts of aminodibenzanthrone while stirring,

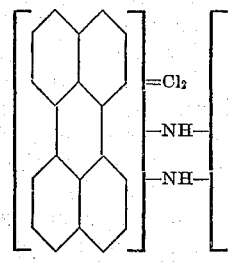

whereupon the mass is worked up in the usual manner. The dyestuff is obtained in the form of a black powder dissolving in concentrated sulphuric acid with a violet coloration and dyeing the vegetable fibre from a blue vat grey to black shades of very good fastness.

Example 5

39 parts of tetrachlorperylene, obtainable by chlorinating perylene in nitrobenzene with sulphuryl chloride with an addition of iodine as halogenating catalyst, are boiled in 500 parts of nitrobenzene with 94 parts of aminodibenzanthrone, 20 parts of sodium acetate and 5 parts of copper oxide while stirring, until all aminodibenzanthrone has entered into reaction. The mass is worked up in the usual manner. A black powder is obtained which probably corresponds to the formula

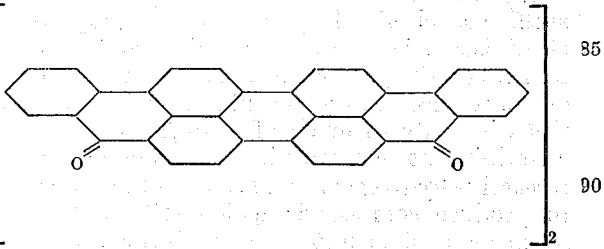

and which dissolves in concentrated sulphuric acid with a violet coloration and dyes cotton from a blue vat grey to black shades.

Example 6

26.5 parts of tetrachlornaphthalene, obtainable by passing chlorine into used naphthalene, are boiled in 500 parts of nitrobenzene with 47 parts of aminodibenzanthrone, 40 parts of sodium acetate and 7 parts of copper oxide while stirring, until unaltered aminodibenzanthrone can no longer be detected, whereupon the mass is worked up in the usual manner. The dyestuff is obtained in the form of a black powder dissolving in concentrated sulphuric acid with a violet coloration and dyeing cotton from a dark blue vat greenish blue shades of excellent fastness.

Example 7

7.2 parts of dibromphenanthrene, obtainable by brominating phenanthrene in glacial acetic acid, are boiled in 250 parts of nitrobenzene with 20 parts of sodium acetate, 0.2 part of copper oxide and 9.4 parts of aminodibenzanthrone while stirring, until unaltered aminodibenzanthrone can no longer be detected. The reaction product which probably corresponds to the formula

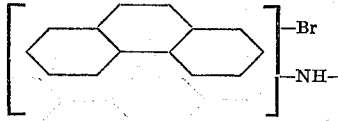 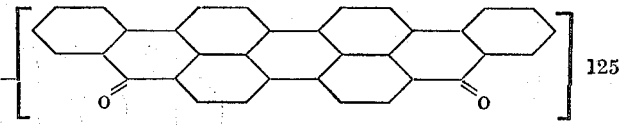

and is separated in the usual manner is a black powder dissolving in concentrated sulphuric acid with a violet coloration and dyes cotton very strong bluish grey to black shades from a blue vat.

A reaction product dyeing similar shades is obtained by condensing 1 molecular proportion of dibromfluorene with 1 molecular proportion of aminodibenzanthrone.

*Example 8*

9.2 parts of tetrabromphenanthrenequinone are boiled in 250 parts of nitrobenzene with 10 parts of soda ash, 2 parts of copper oxide and 11.5 parts of aminodibenzanthrone while stirring, until unaltered aminodibenzanthrone can no longer be detected. By working up in the usual manner the dyestuff is obtained in the form of a black powder dissolving with a bluish red coloration in concentrated sulphuric acid and dyeing the vegetable fibre very strong bluish grey shades from a dark blue vat.

This application is a continuation in part of our copending application Ser. No. 267,478, filed April 4th, 1928.

What we claim is:

1. The process of producing vat dyestuffs which comprises condensing a polynuclear aromatic compound containing a plurality of substituents selected from the group consisting of halogen and the nitro group but which itself does not possess vat dyestuff properties, with only so much of a dibenzanthrone containing at least one nitrogen atom having a reactive hydrogen atom attached thereto as to produce a condensation product still containing at least one substituent selected from the group consisting of halogen and the nitro group.

2. The process of producing vat dyestuffs which comprises condensing a polynuclear aromatic compound containing a plurality of substituents selected from the group consisting of halogen and the nitro group but which itself does not possess vat dyestuff properties, with only so much of a dibenzanthrone containing at least one nitrogen atom having a reactive hydrogen atom attached thereto as to produce a condensation product still containing at least one substituent selected from the group consisting of halogen and the nitro group, in the presence of an inert organic diluent of high boiling point.

3. The process of producing vat dyestuffs which comprises condensing a polynuclear aromatic compound containing a plurality of substituents selected from the group consisting of halogen and the nitro group but which itself does not possess vat dyestuff properties, with only so much of a dibenzanthrone containing at least one nitrogen atom having a reactive hydrogen atom attached thereto as to produce a condensation product still containing at least one substituent selected from the group consisting of halogen and the nitro group, in the presence of an acid-fixing agent.

4. The process of producing vat dyestuffs which comprises condensing a polynuclear aromatic compound containing a plurality of substituents selected from the group consisting of halogen and the nitro group but which itself does not possess vat dyestuff properties, with only so much of a dibenzanthrone containing at least one nitrogen atom having a reactive hydrogen atom attached thereto as to produce a condensation product still containing at least one substituent selected from the group consisting of halogen and the nitro group, in the presence of a copper compound.

5. Grey to black vat dyestuffs giving bluish vats and violet solutions in concentrated sulphuric acid, the said dyestuff probably corresponding to the general formula

in which R stands for a dibenzanthrone radicle, $R_1$ stands for the radicle of a polynuclear isocyclic compound containing at least one substituent selected from the group consisting of halogen and the nitro group and which does not itself possess vat dyestuff properties, and X stands for hydrogen or a low alkyl radicle.

6. Grey to black vat dyestuffs giving bluish vats and violet solutions in concentrated sulphuric acid, the said dyestuffs probably corresponding to the general formula

in which R stands for a dibenzanthrone radicle, $R_1$ stands for the radicle of a polynuclear isocyclic compound which contains at least one substituent selected from the group consisting of halogen and the nitro group and which itself does not possess vat dyestuff properties, which is substitued by at least one further radicle of the type

and X stands for hydrogen or a low alkyl radicle.

7. The dyestuff which probably corresponds to the formula

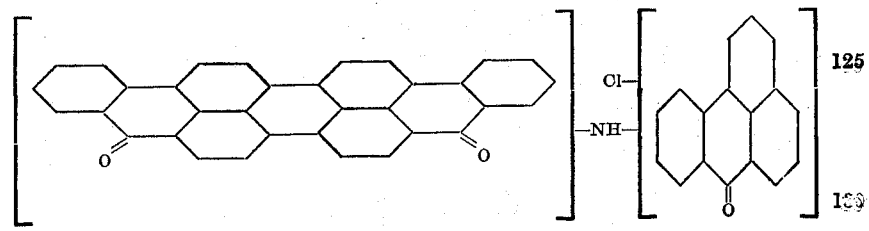

which dissolves in concentrated sulphuric acid with a violet coloration and dyes the vegetable fibre from a blue vat grey to black shades.

In testimony whereof we have hereunto set our hands.

MAX ALBERT KUNZ.
KARL KOEBERLE.